United States Patent
Tan et al.

(10) Patent No.: US 11,734,055 B2
(45) Date of Patent: Aug. 22, 2023

(54) MINIMIZING C-STATE TRANSITIONS DUE TO SOFTWARE TIMER INTERRUPTS

(71) Applicant: Dell Products L.P., Round Rock, TX (US)

(72) Inventors: Danilo O. Tan, Austin, TX (US); Srikanth Kondapi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 17/487,760

(22) Filed: Sep. 28, 2021

(65) Prior Publication Data
US 2023/0102015 A1    Mar. 30, 2023

(51) Int. Cl.
*G06F 9/48*    (2006.01)
*G06F 9/4401*    (2018.01)

(52) U.S. Cl.
CPC .......... *G06F 9/4812* (2013.01); *G06F 9/4411* (2013.01); *G06F 9/485* (2013.01)

(58) Field of Classification Search
CPC ...... G06F 9/4411; G06F 9/4418; G06F 9/442; G06F 9/4812; G06F 9/4825; G06F 9/4837; G06F 9/4843; G06F 9/4887
See application file for complete search history.

(56) References Cited

U.S. PATENT DOCUMENTS

| | | | | |
|---|---|---|---|---|
| 6,397,283 B1* | 5/2002 | Ting | ........................ | G06F 13/24 713/502 |
| 8,397,087 B1* | 3/2013 | Gardner | .................. | G06F 1/329 713/340 |
| 2005/0132096 A1* | 6/2005 | Raghunath | ............ | G06F 1/3215 710/15 |
| 2012/0159204 A1* | 6/2012 | Tang | ..................... | G06F 9/4418 713/310 |
| 2012/0210032 A1* | 8/2012 | Wang | ...................... | G06F 13/24 710/260 |
| 2013/0007492 A1* | 1/2013 | Sokol, Jr. | .............. | G06F 1/3206 713/322 |
| 2014/0181555 A1* | 6/2014 | Bodas | ..................... | G06F 1/324 713/323 |
| 2016/0035162 A1* | 2/2016 | Robertson | ........... | H04L 63/0876 340/5.61 |

* cited by examiner

Primary Examiner — Raymond N Phan
(74) Attorney, Agent, or Firm — Kirton McConkie; Brian Tucker (57) ABSTRACT

C-state transitions due to software timer interrupts can be minimized. A timer interrupt synchronizer can be deployed on a computing device to function as an intermediary between software components that rely on timer interrupts and a timer interrupt architecture of the computing device. When the software components request timer interrupts, the timer interrupt synchronizer can ensure that timer interrupts having the same frequency can be synchronized to occur at the same time. As a result of this synchronization, a CPU can experience fewer C-state transitions due to the timer interrupts.

20 Claims, 11 Drawing Sheets

MINIMIZING C-STATE TRANSITIONS DUE TO SOFTWARE TIMER INTERRUPTS

CROSS-REFERENCE TO RELATED APPLICATIONS

N/A

BACKGROUND

CPUs have multiple operating modes known as "C-states." When fully functional, the CPU will be in its C0 state and may transition into low-power modes (e.g., up to the C10 deep sleep state) when it is idle. The different low-power modes allow the CPU to perform some functionality without fully waking the system (e.g., to perform a quick background task).

Many software components, such as applications, services and drivers, use scheduler or timer interrupts (hereinafter timer interrupts) to perform some action at a predefined time. For example, a messaging application may use a timer interrupt to periodically check for incoming messages. As another example, an optimizer solution may use a timer interrupt to periodically retrieve performance data.

When software components rely on timer interrupts, the timer interrupts will likely cause C-state transitions. In other words, if the timer interrupt occurs while the CPU is in a low-power mode, the CPU may transition to a higher-power mode to service the timer interrupt, including to invoke whatever software components rely on the timer interrupts. In a worst-case scenario, these timer interrupts may occur frequently enough that the CPU will rarely transition into its deep sleep state.

BRIEF SUMMARY

The present invention extends to systems, methods and computer program products for minimizing C-state transitions due to software timer interrupts. A timer interrupt synchronizer can be deployed on a computing device to function as an intermediary between software components that rely on timer interrupts and a timer interrupt architecture of the computing device. When the software components request timer interrupts, the timer interrupt synchronizer can ensure that timer interrupts having the same frequency can be synchronized to occur at the same time. As a result of this synchronization, a CPU can experience fewer C-state transitions due to the timer interrupts.

In some embodiments, the present invention may be implemented as a method for minimizing C-state transitions due to software timer interrupts. A first request to create timer interrupts for a first software component can be received. The first request can specify a first frequency at which the timer interrupts for the first software component should occur. A first offset at which the timer interrupts for the first software component should commence can be calculated. The timer interrupts for the first software component can then be configured to commence in accordance with the first offset. In such embodiments, a second request to create timer interrupts for a second software component can be received. The second request can specify the first frequency at which the timer interrupts for the second software component should occur. A second offset at which the timer interrupts for the second software component should commence can be calculated. The timer interrupts for the second software component can be configured to commence in accordance with the second offset. The first and second offsets can cause the timer interrupts for the first software component and the timer interrupts for the second software component to be synchronized.

In some embodiments, the present invention may be implemented as computer storage media storing computer executable instructions which when executed implement a method for minimizing C-state transitions due to software time interrupts. A timer interrupt synchronizer can receive a first request to create timer interrupts for a first software component. The first request can specify a first frequency. The timer interrupt synchronizer can calculate a first offset at which the timer interrupts for the first software component should commence based on a baseline time, a current time and the first frequency. The timer interrupt synchronizer can then cause the timer interrupts for the first software component to commence in accordance with the first offset.

In some embodiments, the present invention may be implemented as a computing device having a CPU that is capable of C-state transitions and computer storage media storing computer executable instructions which when executed implement a timer interrupt synchronizer that is configured to minimize the C-state transitions due to software timer interrupts. The timer interrupt synchronizer can receive a first request to create one or more timer interrupts for a first software component and a second request to create one or more timer interrupts for a second software component. The timer interrupt synchronizer can then cause the one or more timer interrupts for the first software component and the one or more timer interrupts for the second software component to be synchronized.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
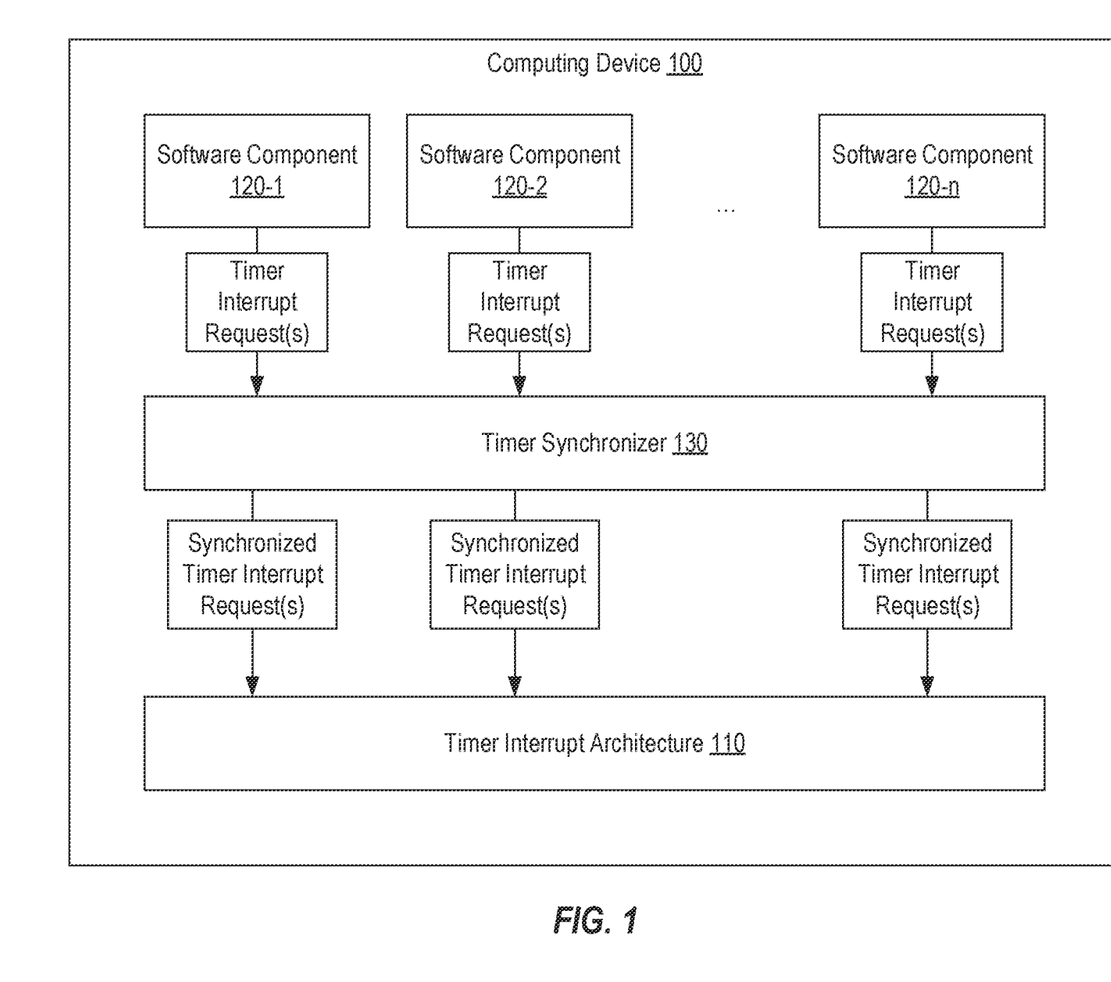
FIG. 1 provides an example of a computing environment in which embodiments of the present invention may be implemented.

FIG. 1 provides an example of a computing device 100 which is configured to implement one or more embodiments of the present invention. Computing device 100 could represent any type of computing device that is capable of supporting the functionality described herein such as, for example, a personal computer. Computing device 100 can include a timer interrupt architecture 110 which may represent the hardware and software components that enable software components 120-1 through **120-*n* (collectively software components 120) to request timer interrupts. Software components 120 could include one or more applications, one or more services, one or more drivers, or any other software component that may be allowed to request a timer interrupt on computing device 100**.

In accordance with embodiments of the present invention, computing device 100 may include a timer interrupt synchronizer 130 which can function as an intermediary between software components 120 and timer interrupt architecture 110 to minimize C-state transitions due to timer interrupts that software components 120 request. Timer interrupt synchronizer 130 may accomplish this by causing timer interrupt requests of multiple software components 120 to be synchronized such that the timer interrupts occur at generally the same time.

Timer interrupt synchronizer 130 may function as an intermediary between software components 120 and timer interrupt architecture 110 in various ways. In some embodiments, timer interrupt synchronizer 130 may provide a library that one or more of software components 120 can be configured to use to request that timer interrupt synchronizer 130 create timer interrupts. In some embodiments, timer interrupt synchronizer 130 may be configured to hook function calls that one or more of software components 120 may make to request that timer interrupt architecture 110 create timer interrupts.

In the remainder of the specification, timer interrupt synchronizer 130 will be described in the context of a Windows-based implementation in which timer interrupt synchronizer 130 hooks the SetTimer function so that it may intercept requests that software components 120 may make to create timer interrupts. However, embodiments of the present invention should not be limited to Windows-based implementations, the hooking of the SetTimer function or any other example technique.

FIGS. 2A-2H provide an example of how timer interrupt synchronizer 130 can minimize C-state transitions due to software timer interrupts that software component 120-1 and software component 120-2 create. Similar functionality could be performed for any number of software components 120.

Figure 2A:
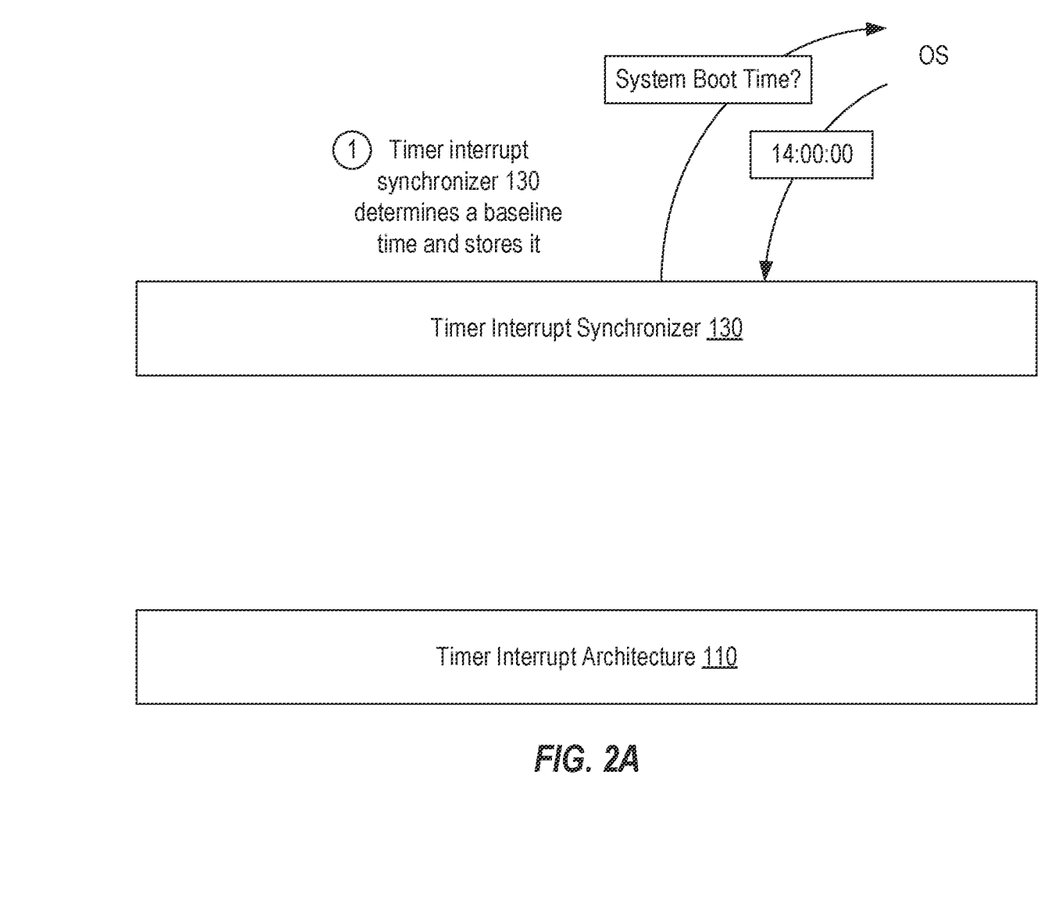
FIGS. 2A-2H provide an example of how embodiments of the present invention can minimize C-state transitions due to software timer interrupts.

Turning to FIG. 2A, it is assumed that timer interrupt synchronizer 130 has been loaded on computing device 100 such as, for example, during startup. Then, in step 1, timer interrupt synchronizer 130 can determine a baseline time and store it. For example, timer interrupt synchronizer 130 could query the operating system for the system boot time (e.g., via systeminfo or wmic on Windows) or any other time that may remain consistent. For purposes of this example, it is assumed that the system boot time is 14:00:00.

Figure 2B:
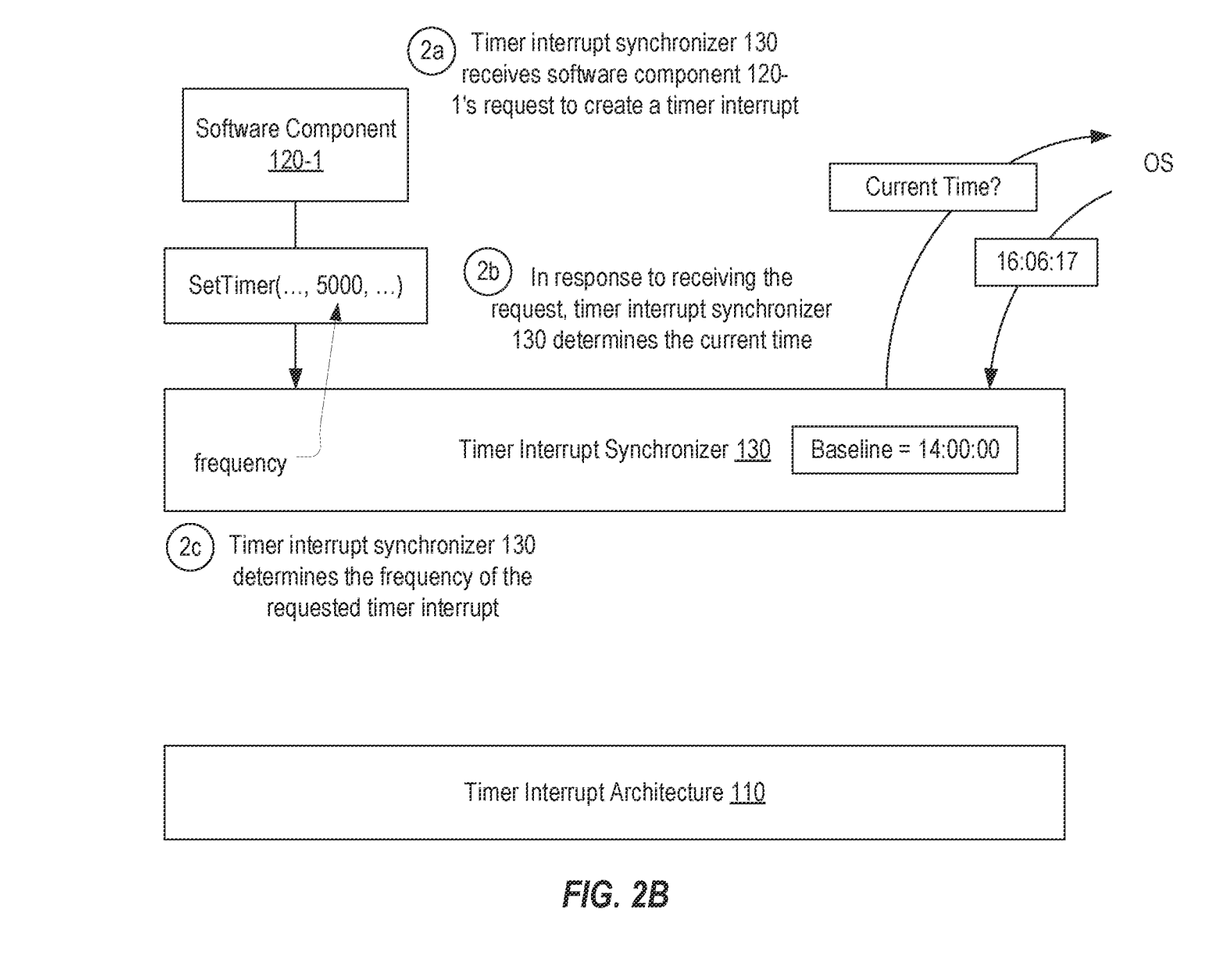

Turning to FIG. 2B, it is now assumed that software component 120-1 has been loaded and has called the SetTimer function to request a timer interrupt every 5 seconds (or 5000 ms). Again, the SetTimer function is only one of various ways in which a software component 120 could request a timer interrupt in embodiments of the present invention. In step 2a and based on the assumption that it hooks the SetTimer function, timer interrupt synchronizer 130 receives/intercepts software component 120-1's request to create a timer interrupt. In embodiments where software component 120-1 is configured to use a library provided by timer interrupt synchronizer 130 to request the creation of a timer interrupt, step 2a could entail timer interrupt synchronizer 130 detecting that software component 120-1 has invoked a function of the library.

In response to receiving software component 120-1's request to create the timer interrupt, in step 2b, timer interrupt synchronizer 130 can determine the current time (e.g., the time at which the request was received or the "request time"). For example, timer interrupt synchronizer 130 could call GetSystemTime in Windows. In step 2c, timer interrupt synchronizer 130 can also analyze the request to create the timer interrupt to determine the frequency at which the timer interrupt should occur. In this example, it is assumed that software component 120-1 is requesting a timer interrupt every 5 seconds (or 5000 ms).

Figure 2C:
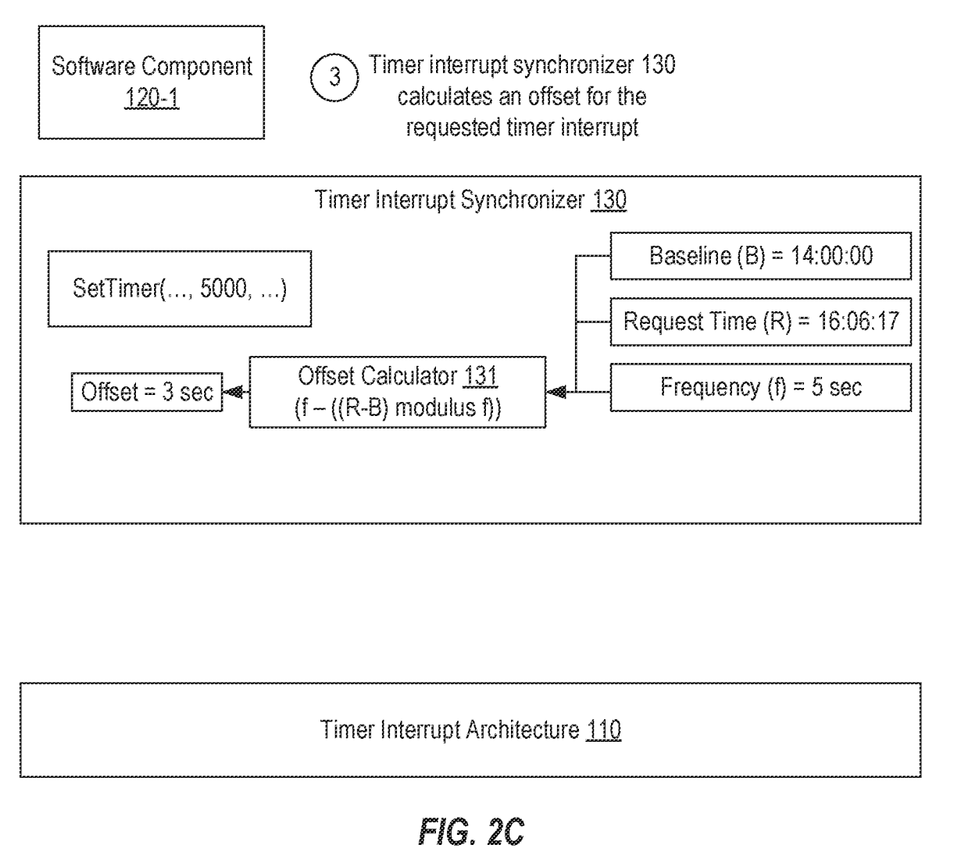

Turning to FIG. 2C, in step 3, timer interrupt synchronizer 130 can calculate an offset for software component 120-1's request to create a timer interrupt. For example, timer interrupt synchronizer 130 may include an offset calculator 131 that employs the baseline time (B), the request time (R) and the frequency (f) of the requested timer interrupt to calculate an offset using the formula: offset=(f−(R−B) modulus f). In this example, the offset would be (5−(16:06:17−14:00:00) modulus 5)=3 seconds.

Figure 2D:
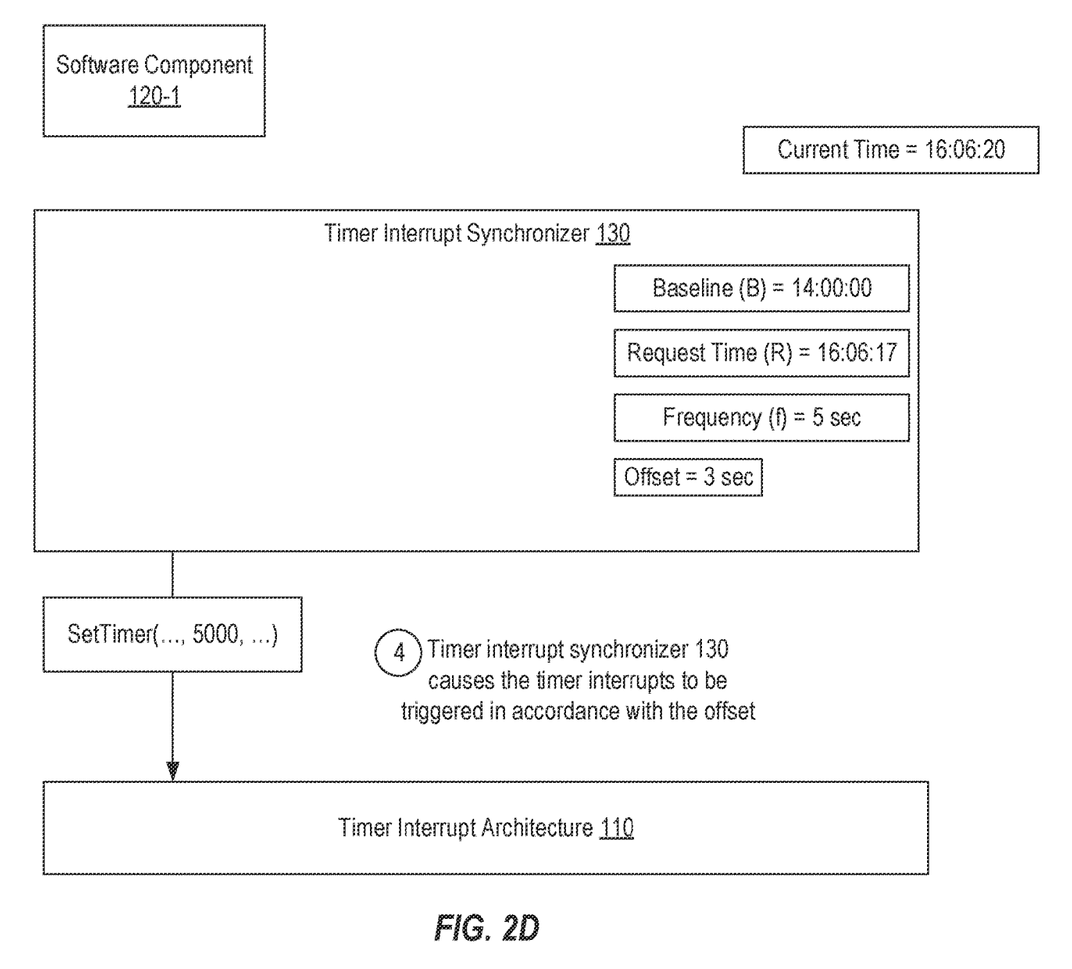

Turning to FIG. 2D, in step 4, timer interrupt synchronizer 130 can cause the timer interrupt(s) requested by software component 120-1 to be triggered in accordance with the calculated offset. In the example, given that the offset was calculated to be 3 seconds and the request time was 16:06:17, timer interrupt synchronizer 130 can apply the offset to the request time so that the timer interrupts will occur at a frequency of 5 seconds from 16:06:20 rather than from 16:06:17.

In some embodiments, timer interrupt synchronizer 130 can cause the timer interrupts to be triggered in accordance with the offset by waiting for a period equal to the offset before submitting the request to timer interrupt architecture 110. For example, timer interrupt synchronizer 130 could wait until the current time is 16:06:20, which is the request time plus the 3 second offset, to pass the SetTimer request to timer interrupt architecture 110. Similarly, in embodiments where timer interrupt synchronizer 130 provides a library that software component 120-1 invoked in step 2a, timer interrupt synchronizer 130 could wait until 16:06:20 to call the SetTimer function (or any other function that may create a timer interrupt for software component 120-1). Alternatively, timer interrupt synchronizer 130 could request a first timer interrupt at the calculated offset (e.g., by setting the DueTime field to 3000 in a call to the CreateTimerQueueTimer function in Windows) and request subsequent timer interrupts at the specified frequency after the calculated offset (e.g., by setting the Period field to 5000 in the call to the CreateTimerQueueTimer function).

Accordingly, timer interrupt synchronizer 130 could use different techniques to cause timer interrupts to be triggered for software component 120-1 in accordance with the calculated offset. Of primary importance is that the timer interrupts will occur at 5 second increments relative to the baseline time as opposed to at 5 second increments relative to the request time (unless the request time is a 5 second increment from the baseline).

Although this example represents a scenario where the timer interrupts will occur indefinitely until software component 120 terminates them, some requests to create timer interrupts may specify a frequency and a number of timer interrupts. In such cases and as part of step 4, timer interrupt synchronizer 130 can ensure that the specified number of timer interrupts occur, each in accordance with the offset and the frequency. This could be represented by the following function:

$$\text{Timer Interrupt Times} = f - ((R - B) \text{ modulus } f) + \sum_{k=0}^{n} x^k$$

where f is the requested frequency of the timer interrupt, R is the request time, B is the baseline time, and n is the number of timer interrupts requested.

Figure 2E:
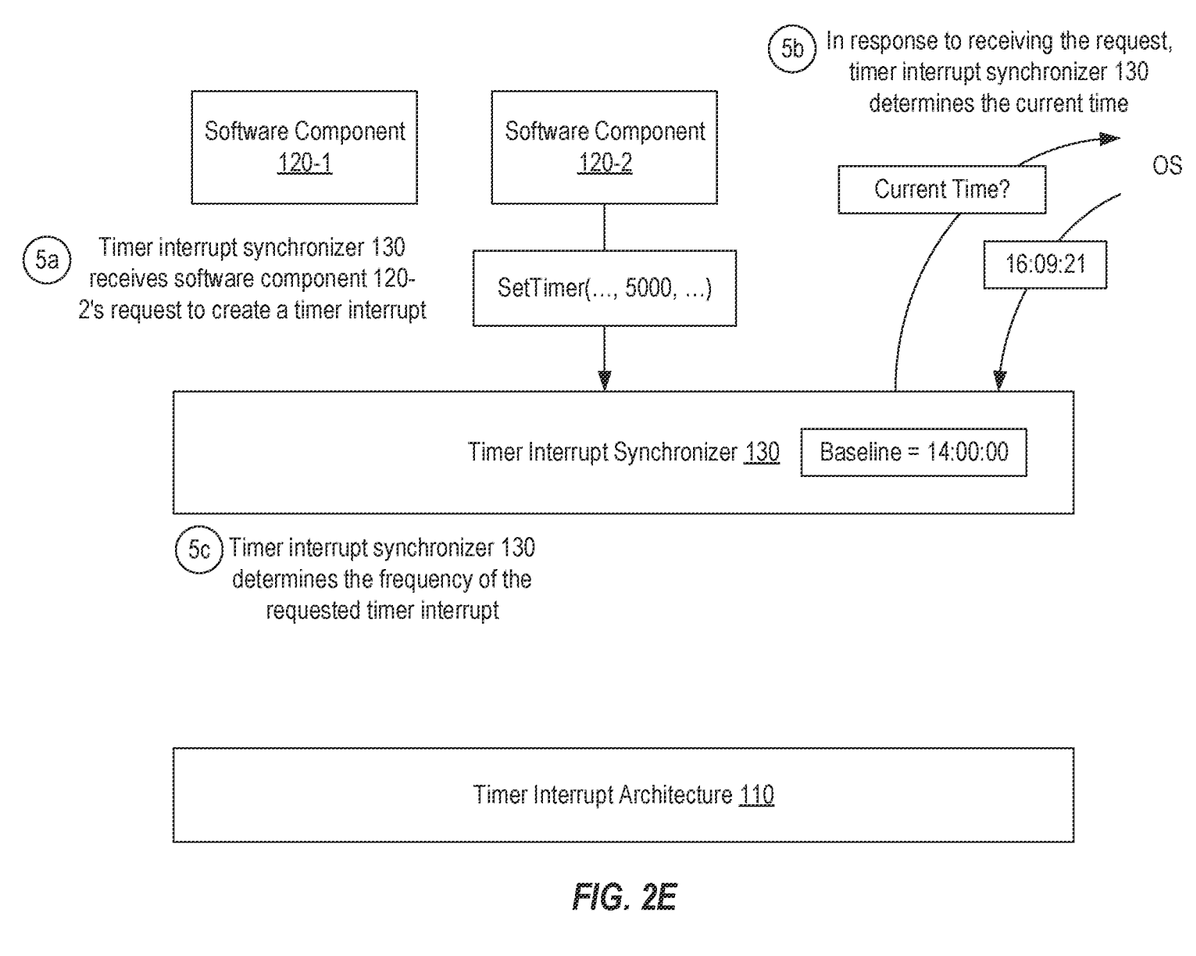

Turning to FIG. 2E, it is now assumed that software component 120-2 has called the SetTimer function to request timer interrupts every 5 seconds while the timer interrupts for software component 120-1 are occurring. In steps 5*a*-5*c*, which are similar to steps 2*a*-2*c*, timer interrupt synchronizer 130 receives the request, determines the current time, which is assumed to be 16:09:21, and the frequency.

Figure 2F:
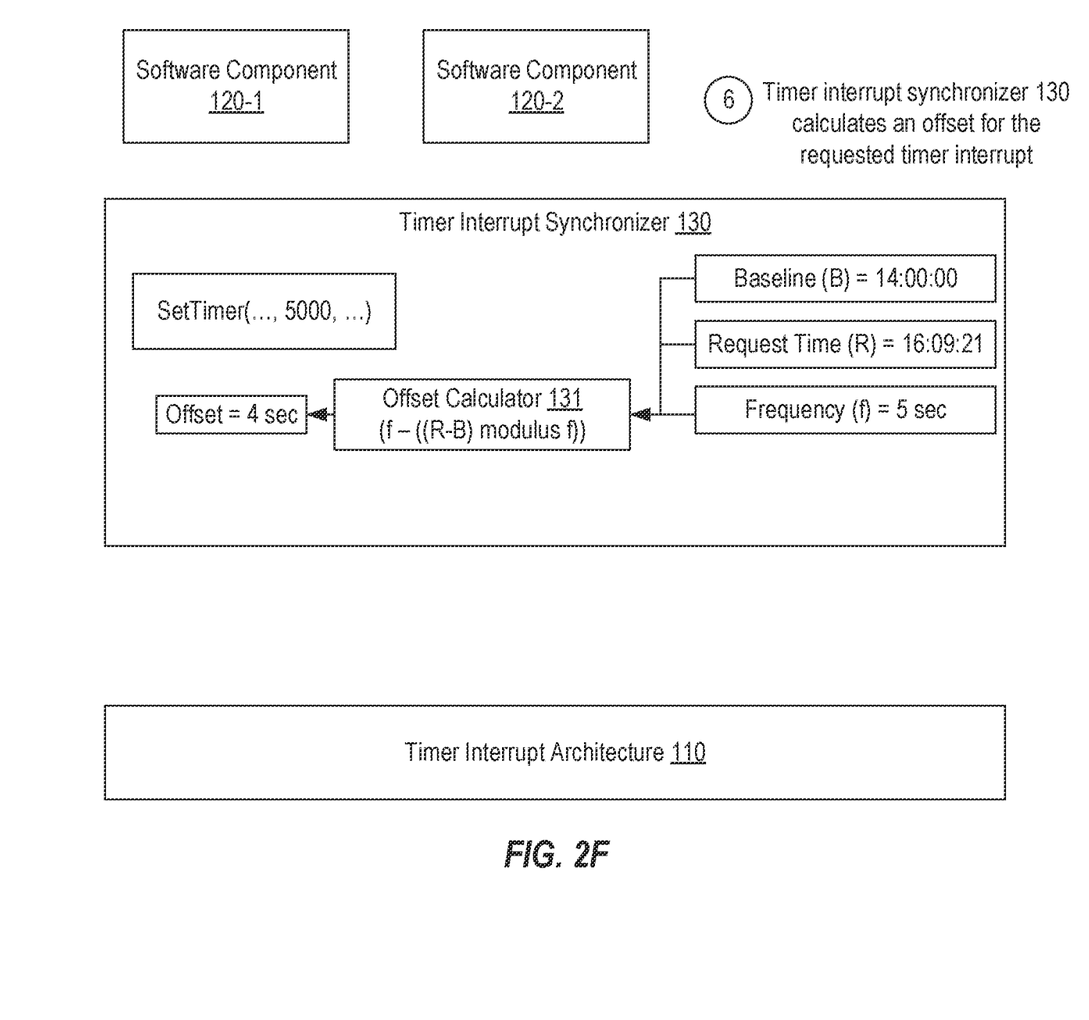

Turning to FIG. 2F, in step 6, which is similar to step 3, time synchronizer 130 can calculate the offset for software component 120-2's request. In this case, the offset will be (5−(16:09:21−14:00:00) modulus 5)=4 seconds.

Figure 2G:
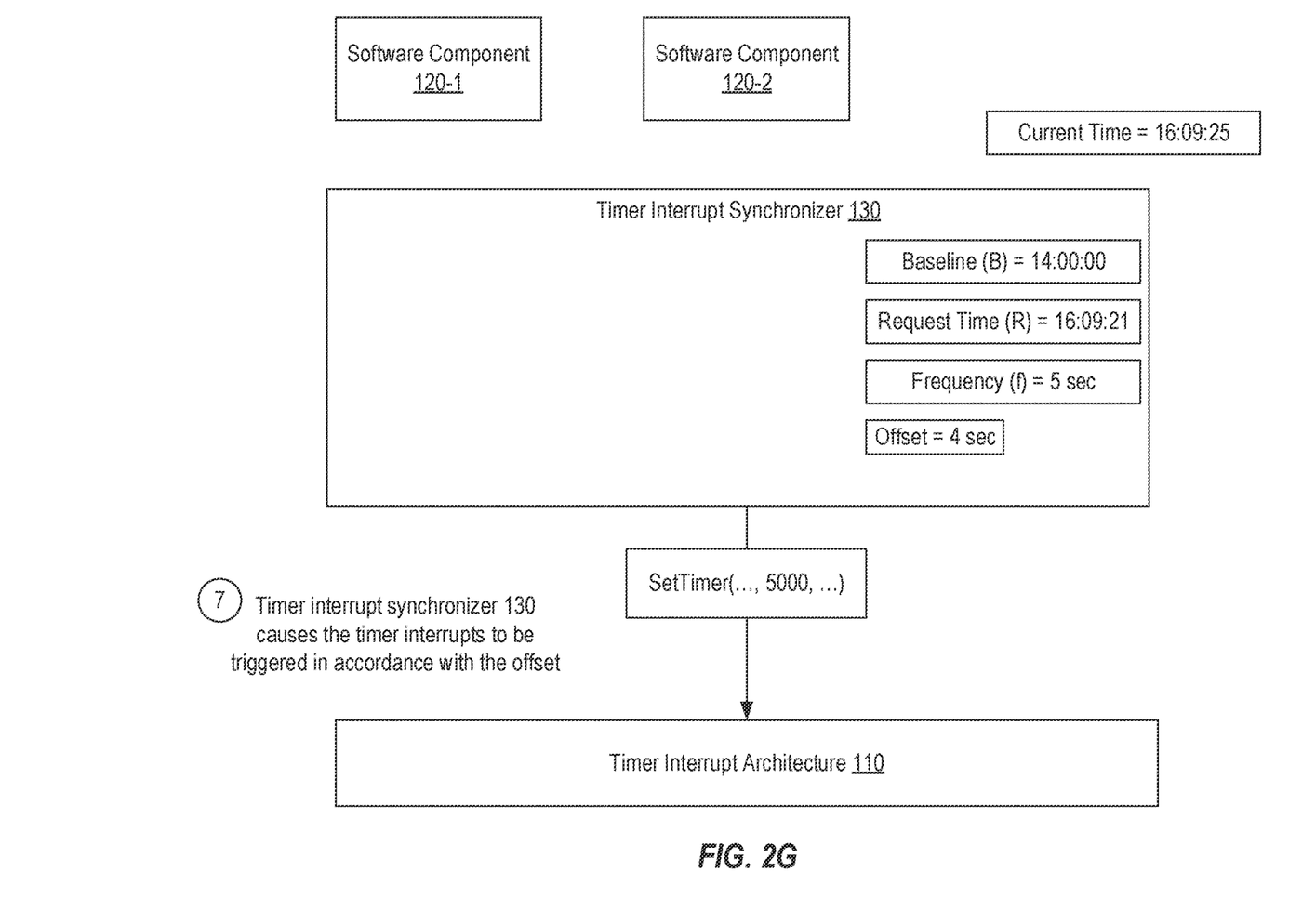
Figure 2H:
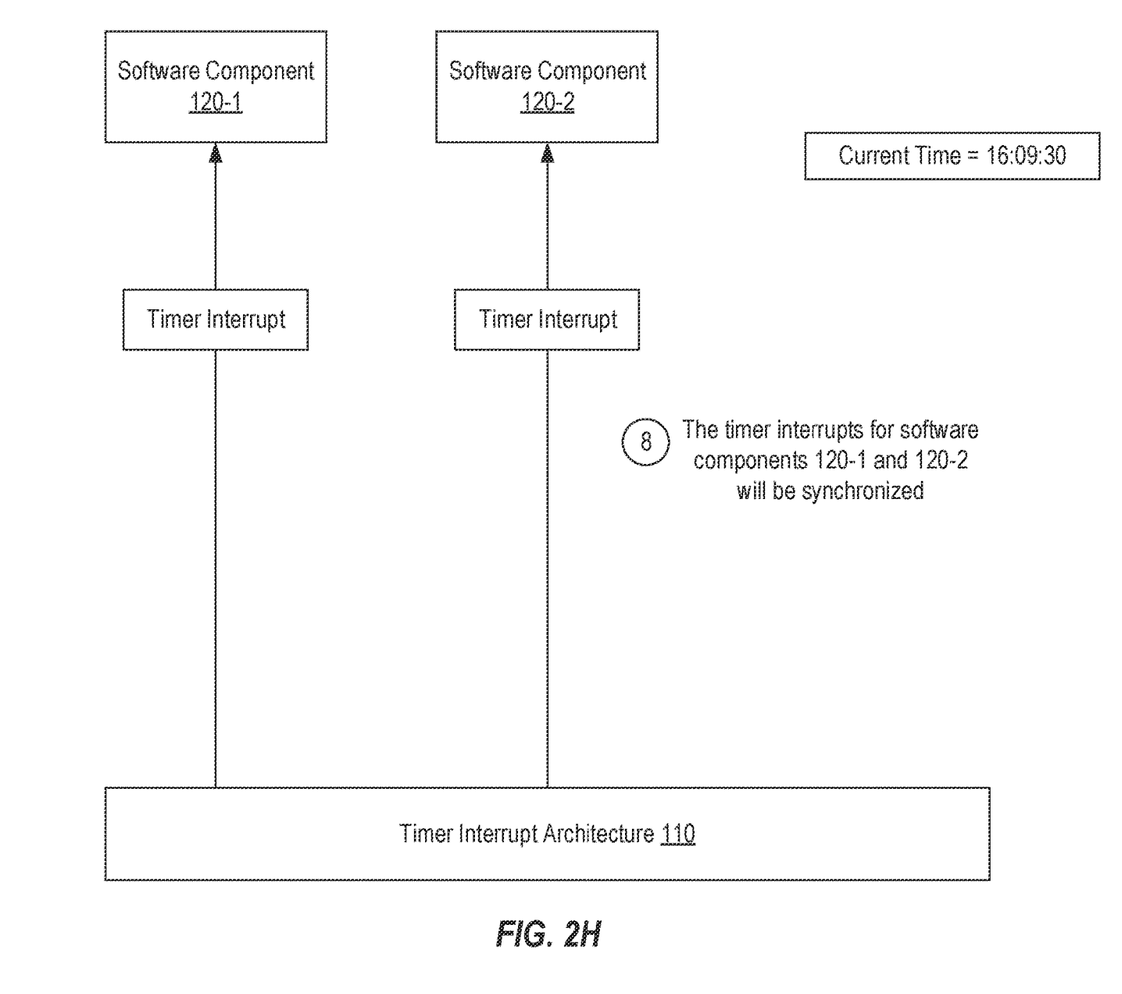

Turning to FIG. 2G, in step 7, timer interrupt synchronizer 130 can cause the timer interrupts requested by software component 120-2 to be triggered in accordance with the calculated 4 second offset. For example, timer interrupt synchronizer 130 could wait until the current time is 16:09:25 to pass the call to SetTimer on to timer interrupt architecture 110.

Turning to FIG. 8, because timer interrupt synchronizer 130 caused the timer interrupts requested by software component 120-1 to be offset by 3 seconds relative to the respective request time and caused the timer interrupts requested by software component 120-2 to be offset by 4 seconds relative to the respective request time, the timer interrupts for the two software components will occur at the same general time such as at 16:09:30 and every five second increment thereafter.

In contrast, without timer interrupt synchronizer 130, a timer interrupt would have occurred for software component 120-1 at 16:06:22 and every five second increment thereafter and a timer interrupt would have occurred for software component 120-2 at 16:09:26 and every five second increment thereafter. In such a case, a timer interrupt would occur at 16:09:26, 16:09:27, 16:10:31, 16:10:32, and so forth which could result in many C-state transitions and prevent the CPU from entering a deep sleep mode.

By synchronizing timer interrupts requested by different software components 120, timer interrupt synchronizer 130 can allow the CPU to awaken once from a lower-power mode to enable the multiple software components 120 to perform their functionality and then return to the lower-power mode until the next synchronized timer interrupts occur. As a result, and particularly when there are many software components 120 that have requested periodic timer interrupts, the CPU may make fewer C-state transitions and may spend more time in lower-power modes.

In some embodiments, timer interrupt synchronizer 130 can support persistent timer interrupt requests. A persistent timer interrupt request is a timer interrupt request that is persisted by a software component 120 when it is run at an earlier time and then re-applied when it is run at a later time. For example, a software component 120 could be configured to retrieve a catalog every 8 hours. In such a case, if computing device 100 were restarted four hours into this 8-hour period, after the restart, the software component 120 could re-apply the timer interrupt request but specify that the timer interrupt occur in 4 hours and every 8 hours thereafter.

To synchronize persistent timer interrupt requests made by multiple software components, timer interrupt synchronizer 130 could implement functionality similar to the functionality described above except that an offset applicable to each persistent timer interrupt request having the same frequency can be calculated by subtracting each next persistent timer interrupt time from the baseline time and selecting the minimum as the offset.

Figure 3:
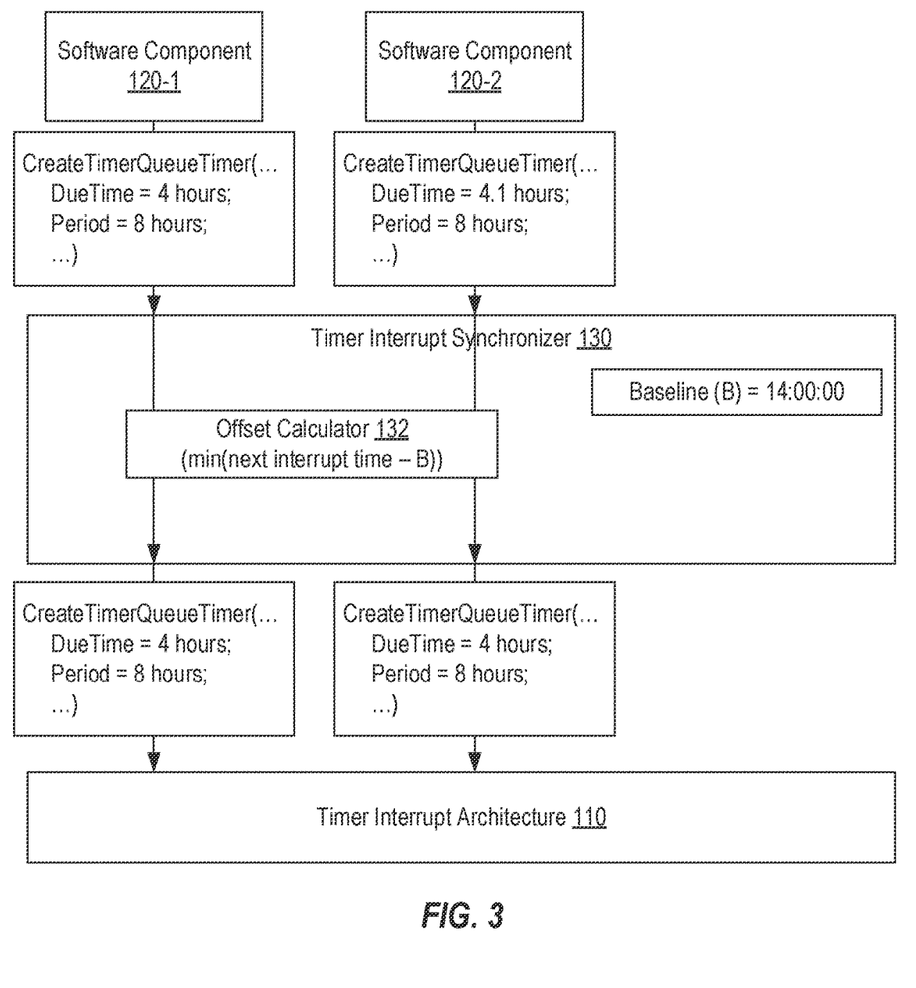
FIG. 3 provides an example of how embodiments of the present invention may minimize C-state transitions due to persistent software timer interrupts.

FIG. 3 provides an example of how timer interrupt synchronizer 130 can synchronize persistent timer interrupts. In this example, the baseline is again assumed to be 14:00:00 and software components 120-1 and 120-2 are assumed to call the CreateTimerQueueTimer function to request a timer interrupt every 8 hours with the first timer interrupt occurring in 4 hours for software component 120-2 and in 4.1 hours for software component 120-2. In such a case, an offset calculator 132 of timer interrupt synchronizer 132 could calculate the offset for both requests as the minimum of the next interrupt times minus the baseline time or the minimum of 18:00:00−14:00:00 and 18:06:00−14:00:00, which would be 04:00:00 or 4 hours. As shown, timer interrupt synchronizer 130 could then cause each of software components 120-1 and 120-2 to receive timer interrupts in accordance with the offset, which is in four hours, and every 8 hours thereafter. In the specific example where the CreateTimerQueueTimer function is employed, timer interrupt synchronizer 130 could accomplish this by setting the DueTime field in each request to the calculated offset.

FIG. 3 provides an example where it is assumed that timer interrupt synchronizer 130 hooks the CreateTimerQueueTimer function. However, in other embodiments, timer interrupt synchronizer 130 may provide a function that software components 120 could call to request that timer interrupt synchronizer 130 create a persistent timer interrupt that is synchronized with other persistent timer interrupts having the same frequency. In such embodiments, timer interrupt synchronizer 130 could be configured to call the CreateTimerQueueTimer function on behalf of each software component 120 while causing such calls to specify the calculated offset in the DueTime field. Of course, timer interrupt synchronizer 130 could perform similar functionality with other functions for creating timer interrupts.

In some embodiments, timer interrupt synchronizer 130 may provide a mechanism by which software components 120 may specify a range of possible frequencies for the timer interrupts, and timer interrupt synchronizer 130 may use such ranges to synchronize the timer interrupts for multiple software components 120.

Figure 4:
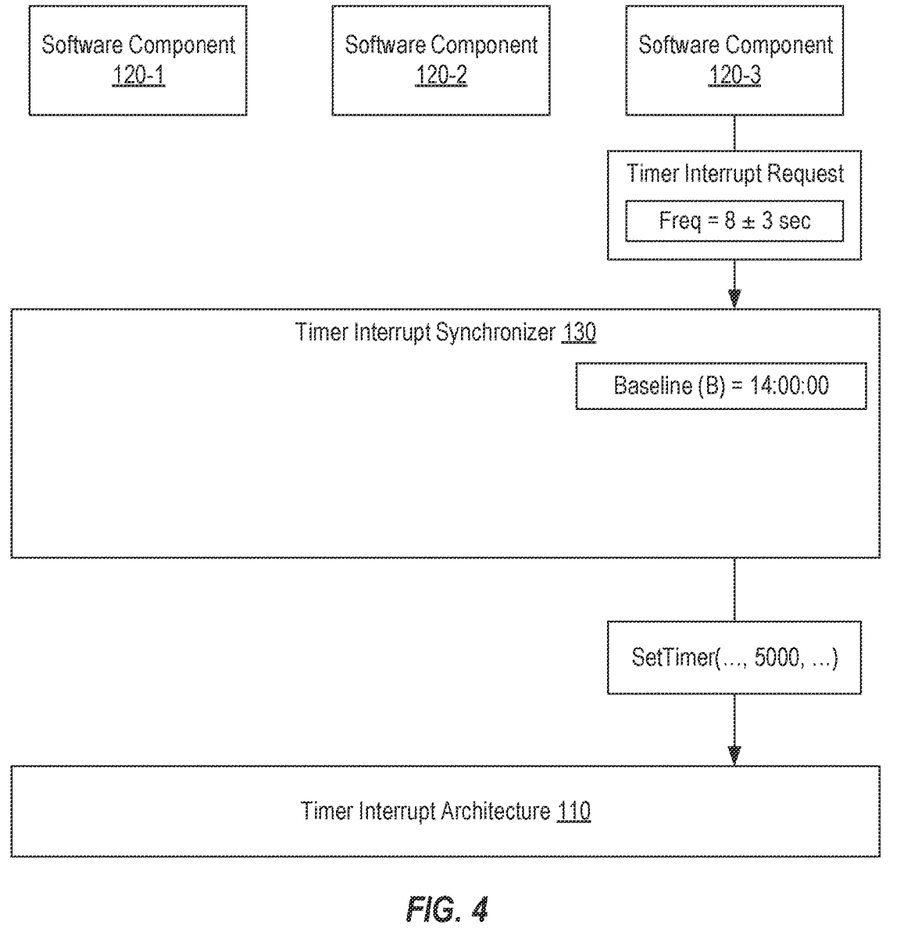
FIG. 4 provides an example of how embodiments of the present invention may enable a software component to specify a range of frequencies at which timer interrupts could occur to thereby facilitate synchronizing timer interrupts for multiple software components.

FIG. 4 provides an example, which is based on the example of FIGS. 2A-2H, of how timer interrupt synchronizer 130 can facilitate synchronizing timer interrupts by enabling software components 120 to specify a range of acceptable frequencies for the timer interrupts. In FIG. 4, it is assumed that software component 120-1 and software component 120-2 are receiving the synchronized timer interrupts every 5 seconds due to the functionality represented in FIGS. 2A-2H. It is then assumed that software component 120-3 submits a timer interrupt request to timer interrupt synchronizer 130 (e.g., via an API that timer interrupt synchronizer 130 provides). As shown, this timer interrupt request specifies a frequency of 8±3 seconds. Notably, in making this timer interrupt request, software component 120-3 will not know of the synchronized timer interrupts that software components 120-1 and 120-2 are receiving.

Upon receiving the timer interrupt request from software component 120-3, timer interrupt synchronizer 130 can identify the specified frequency range and compare it to the frequency of any timer interrupts that other software components 120 may be receiving. In this example, timer interrupt synchronizer 130 will determine that it has already caused the timer interrupts for software components 120-1 and 120-2 to be synchronized at 5 second intervals. Therefore, timer interrupt synchronizer 130 can select a 5-second frequency for the timer interrupts for software component 120-3 and cause them to also be synchronized at 5-second intervals relative to the baseline (e.g., using offset calculator 131). As can be seen, by allowing software components 120 to specify a frequency range for timer interrupts, timer interrupt synchronizer 130 is more likely to be able to synchronize the timer interrupts of multiple software components 120.

In summary, a timer interrupt synchronizer can be employed on a computing device to function as an intermediary between any number of software components and the timer interrupt architecture available on the computing device. The timer interrupt synchronizer could be configured to intercept requests to create timers made by software components that are not designed to interface directly with the timer interrupt synchronizer and/or could be configured to provide an interface by which software components could request that the timer interrupt synchronizer create timer interrupts for the software components. In either case, the timer interrupt synchronizer can cause the timer interrupts that are for multiple software components and that have the same frequency to occur at the same time. In this way, C-state transitions due to software timer interrupts can be minimized.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for minimizing C-state transitions due to software timer interrupts, the method comprising:
   receiving a first request to create timer interrupts for a first software component, the first request specifying a first frequency at which the timer interrupts for the first software component should occur;
   calculating a first offset at which the timer interrupts for the first software component should commence; and
   causing the timer interrupts for the first software component to commence in accordance with the first offset.

2. The method of claim 1, further comprising:
   receiving a second request to create timer interrupts for a second software component, the second request specifying the first frequency at which the timer interrupts for the second software component should occur;
   calculating a second offset at which the timer interrupts for the second software component should commence; and
   causing the timer interrupts for the second software component to commence in accordance with the second offset;
   wherein the first and second offsets cause the timer interrupts for the first software component and the timer interrupts for the second software component to be synchronized.

3. The method of claim 1, wherein the first request is received by intercepting the first request.

4. The method of claim 1, wherein the first request is received directly from the first software component.

5. The method of claim 1, wherein the first offset is calculated using a baseline time.

6. The method of claim 1, wherein the first software component is an application, a service or a driver.

7. The method of claim 2, wherein the first and second offsets are different.

8. The method of claim 2, wherein the second request specifies the first frequency within a range of frequencies, and wherein the method further comprises selecting the first frequency from the range of frequencies.

9. The method of claim 2, further comprising:
receiving a third request to create timer interrupts for a third software component, the third request specifying the first frequency at which the timer interrupts for the third software component should occur;
calculating a third offset at which the timer interrupts for the third software component should commence; and
causing the timer interrupts for the third software component to commence in accordance with the third offset;
wherein the first, second and third offsets cause the timer interrupts for the first software component, the timer interrupts for the second software component and the timer interrupts for the third software component to be synchronized.

10. The method of claim 5, wherein the baseline time is a system boot time.

11. The method of claim 5, wherein the first offset is calculated based on a current time at which the first request is received.

12. One or more computer storage media storing computer executable instructions which when executed implement a method for minimizing C-state transitions due to software time interrupts, the method comprising:
receiving, at a timer interrupt synchronizer, a first request to create timer interrupts for a first software component, the first request specifying a first frequency;
calculating a first offset at which the timer interrupts for the first software component should commence based on a baseline time, a current time and the first frequency; and
causing the timer interrupts for the first software component to commence in accordance with the first offset.

13. The computer storage media of claim 12, wherein the baseline time is a system boot time.

14. The computer storage media of claim 12, wherein the first offset is calculated using the formula (frequency−((current time−baseline time) modulus frequency)).

15. The computer storage media of claim 12, wherein the method further comprises:
receiving, at the timer interrupt synchronizer, a second request to create timer interrupts for a second software component, the second request specifying the first frequency;
calculating a second offset at which the timer interrupts for the second software component should commence based on the baseline time, a current time for the second request and the first frequency; and
causing the timer interrupts for the second software component to commence in accordance with the second offset.

16. The computer storage media of claim 12, wherein the method further comprises:
receiving, at the timer interrupt synchronizer, a second request to create timer interrupts for a second software component, the second request specifying a frequency range that includes the first frequency;
selecting the first frequency for the timer interrupts for the second software component based on the timer interrupts for the first software component occurring at the first frequency;
calculating a second offset at which the timer interrupts for the second software component should commence based on the baseline time, a current time for the second request and the first frequency; and
causing the timer interrupts for the second software component to commence in accordance with the second offset.

17. The computer storage media of claim 12, wherein the first software component is an application, a service or a driver.

18. The computer storage media of claim 12, wherein the timer interrupt synchronizer receives the first request either directly from the first software component or by hooking a call that the first software component makes.

19. A computing device comprising:
a CPU that is capable of C-state transitions; and
computer storage media storing computer executable instructions which when executed implement a timer interrupt synchronizer that is configured to minimize the C-state transitions due to software timer interrupts by performing the following:
receiving a first request to create one or more timer interrupts for a first software component;
receiving a second request to create one or more timer interrupts for a second software component; and
causing the one or more timer interrupts for the first software component and the one or more timer interrupts for the second software component to be synchronized.

20. The computer device of claim 19, wherein causing the one or more timer interrupts for the first software component and the one or more timer interrupts for the second software component to be synchronized comprises calculating at least one offset.

* * * * *